United States Patent [19]
Angwin et al.

[11] Patent Number: 6,167,450
[45] Date of Patent: *Dec. 26, 2000

[54] DATA COMMUNICATIONS MANAGEMENT SYSTEM AND PROTOCOL REPLACEMENT METHOD FOR MOBILE COMMUNICATION ENVIRONMENTS

[75] Inventors: Alastair John Angwin, Southampton, United Kingdom; Stefan George Hild, Adliswil, Switzerland

[73] Assignee: International Business Machines Corporation, Armonk, N.Y.

[ * ] Notice: This patent issued on a continued prosecution application filed under 37 CFR 1.53(d), and is subject to the twenty year patent term provisions of 35 U.S.C. 154(a)(2).

[21] Appl. No.: 09/019,543

[22] Filed: Feb. 6, 1998

[30] Foreign Application Priority Data

Jul. 30, 1997 [GB] United Kingdom .................... 9715966
Sep. 8, 1997 [GB] United Kingdom .................... 9718885

[51] Int. Cl.[7] ........................... G06F 15/16; G06F 15/173
[52] U.S. Cl. .......................... 709/227; 709/228; 709/230; 709/250; 709/237; 709/217; 709/218; 370/236; 370/467; 370/355
[58] Field of Search ..................................... 709/227, 228, 709/230, 237, 217, 218, 219, 225, 250; 370/236, 467, 355

[56] References Cited

U.S. PATENT DOCUMENTS

| | | | |
|---|---|---|---|
| 5,734,831 | 3/1998 | Sanders | 709/223 |
| 5,734,865 | 3/1998 | Yu | 709/250 |
| 5,818,619 | 10/1998 | Medved et al. | 359/172 |
| 5,909,545 | 6/1999 | Frese, II et al. | 709/208 |

FOREIGN PATENT DOCUMENTS 2 286 099  8/1995  United Kingdom .

*Primary Examiner*—Zarni Maung
*Assistant Examiner*—Beatriz Prieto
*Attorney, Agent, or Firm*—Jeanine S. Ray-Yarletts

[57] ABSTRACT

Provided is a data communications management system which enables the use of conventional network applications across mobile communications links, addressing the problem that these applications (which are written for fast, reliable and cheap wired connections) are not well adapted for mobile communications. A set of call handler components are provided for each of a plurality of different network communication applications, and a call manager component which intercepts and analyses all communication calls from applications on the local system and redirects them to the appropriate call handler. The call handler then performs functions transparently impersonating the remote target of the communication, and replaces the initial protocol of the call with a different protocol which is optimised for the particular service. In some cases, a second call handler is provided at the remote end which replaces the protocol again before delivering the call to the target.

10 Claims, 3 Drawing Sheets

DATA COMMUNICATIONS MANAGEMENT SYSTEM AND PROTOCOL REPLACEMENT METHOD FOR MOBILE COMMUNICATION ENVIRONMENTS

FIELD OF THE INVENTION

The present invention relates to data communications within a network, and in particular to managing data communications to enable the efficient use of conventional network applications without reliance on permanent connections throughout a communication session, and/or without reliance on the availability of high speed communication links. The invention is particularly useful for supporting the use of conventional network communication applications in a mobile communications environment.

BACKGROUND OF THE INVENTION

Telephone lines and other communication links have been used for many years to establish remote access to a computer system. Modems on either end of the line convert computer data into signals suitable for transmission over the conventional telephone lines. A remote session is initiated by dialling the remote modem. After a telephone link has been established, both modems engage in an initial data exchange (a 'training period') to establish various communication parameters. This training period may take up to 30 seconds to complete. Thereafter, the remote user has direct access to the computer system and can interact with it in a known manner. The low speed of communication over a conventional telephone link prevents the use of graphical applications, but text-based terminal programs can be run with acceptable performance. Examples of programs used for remote logins are 'Telnet' and 'tn3270', which rely on a previous process (such as the known process SLIPDIAL) to establish the connection as described above. Other known applications provide both the call initialisation and close-down as well as the remote terminal application (for example, IBM's PASSPORT or PROCOMM's PCPLUS).

The telephone connection is required throughout the communication session, even while both computer systems are idle, for example while waiting for input from the user.

Many solutions have been proposed in the past to make the use of the expensive telephone links more efficient. Batch processing is widely used for this purpose: instead of running applications on-line, data is bulk transmitted and applications run locally without actually being connected. Popular e-mail application programs such as 'Remote Win-Mail' and 'cc:Mail' allow users to compose e-mail messages without requiring connectivity. The actual sending of the message (for which a telephone connection will be established automatically) may be scheduled based on telephone tariffs or the importance of the mail message.

Hence, remote data access over telephone connections is possible by either:
  establishing a single telephone connection throughout the session and then using conventional applications, or
  establishing brief but frequent telephone connections to exchange data and then using customised applications for batch-processing.

The latter approach is generally less costly. However, applications for batch-processing often require unfamiliar and difficult user interaction patterns. There is a need for a system which offers the benefits of real connection-oriented applications without the cost and inconvenience of having to be attached by a permanent telephone connection.

Telephone tariffs of wired networks are sufficiently prohibitive that they restrict usage of network communication applications, but mobile communication links (wireless connections) are generally far slower and more expensive than fixed-wire communication links and so this problem is much more critical in a mobile environment. Conventional network communication applications such as telnet, file transfer protocol (ftp) or 'sendmail', and the conventional protocols that they use (such as the widely used TCP/IP suite of protocols), are written to operate on top of relatively fast, reliable and cheap wired network connections and are not optimised for the mobile environment. They typically either fail completely or perform badly due to the alien line characteristics of the mobile data links.

For example, TCP/IP does not distinguish between the loss of a data packet and a transmission error—both are interpreted as a sign of network congestion, and TCP/IP reacts by applying an exponential back-off algorithm and reducing throughput. On mobile data links, however, a lost data packet is much more likely to be caused by a fading mobile link or excessive bit error rates during transmission. Forward error correction would correct these, but TCP/IP increases the wait time and then reduces the passage transmission rate (reducing the number of currently open packets). This will do nothing to solve the problem and will further degrade the user-perceived link quality by introducing artificial time delays. Alternative methods and algorithms more suitable for mobile data links are readily available, but are not easily combined with TCP/IP.

Furthermore, TCP/IP is unable to take advantage of the point-to-point nature of mobile data links such as GSM channels. In the multi-user environment that TCP/IP was designed for, each packet requires extensive headers to allow routing, assignment to individual logical connection, and to reassemble the packets at the remote side. On point-to-point links, most of these headers are redundant.

Routing in TCP/IP is based on static and hierarchical IP addresses; this causes problems if mobile hosts connect to the network at different access points and do not want to change their IP addresses.

Specialised applications can be written which can support the same functionality as telnet, ftp or sendmail in a mobile environment with adequate performance, but there are a number of reasons why conventional applications should be used instead. Firstly, mobile applications often require unfamiliar and difficult user interaction patterns. Many computer operators learn only a small set of applications and are reluctant to adopt new designs, especially where the new design duplicates and is required to be used alongside the old design. Secondly, conventional network communication applications are widely available and readily installed on many computer systems and it is desirable to make full use of these existing resources. Furthermore, adapting applications for wireless links typically involves very specific modifications which cannot be abstracted and re-used with other applications, and so the effort has to be repeated for each application.

There is a need to enable conventional network applications to work efficiently in a mobile environment while avoiding the need for new mobile-aware applications. There is also a need to manage data communications in a manner which achieves efficient use of conventional network applications without reliance on permanent connections throughout a communication session even when not in a mobile environment.

SUMMARY OF THE INVENTION

In a first aspect, the present invention provides a data communications system including a call manager and a call handler for use in network communications. The call manager receives communication calls generated by applications on the local system, analyses these calls to identify their origin, and then, according to the results of the identification step, either passes the calls directly to the external network or redirects them to a call handler module on the local system for the further handling of the communication call.

If directed to a call handler, the call handler manages communications between the origin and destination according to a predefined preferred communication protocol. Where the protocol of the initial communication is not the preferred protocol, the call handler preferably terminates the initial call and initiates a new call using the preferred protocol (i.e. it replaces the original protocol) in a manner which is transparent to the applications. The call handler preferably operates as a proxy for the target for the communication and certain operations such as the generation of acknowledgements are performed by the call handler while appearing from the sender application's perspective as though they were performed by the target for the communication using the initial protocol.

The present invention can be implemented without requiring any changes to conventional applications or their set up, or the user interaction to work with them.

According to the preferred embodiment of the invention, a different specialised call handler module is provided for each of a plurality of different network services. The communications manager determines whether the call should be redirected to a call handler module, and selects an appropriate call handler module, and then the selected call handler module performs protocol replacement and proxy functions.

In an alternative embodiment of the invention, a single generic call handler may initiate protocol selection and replacement on behalf of all of the communications generated by applications on the local system which have been identified for redirection.

Certain prior art data communication solutions include processes referred to as "protocol conversions". These involve modifying an existing data stream to enable onward communication—such as intercepting conventional TCP/IP traffic at a gateway and modifying the data stream. The modification may involve adding some control information which conforms to a second communication protocol (known as protocol encapsulation), and possibly compressing essential control information while omitting from the modified data stream control information which is inessential.

The general approach of this prior art is to make the minimum necessary modifications to the original protocol. Preserving TCP/IP's end-to-end semantics while adding new functionality is a significant problem for these prior art schemes, the protocol changes are generally not transparent to the communicating applications, and there is a limit to the degree of performance enhancement they can achieve.

The present invention is distinguished from this prior art in that it implements a complete protocol replacement—locally terminating the initial protocol which has been determined not to be optimal for the call—with the onward communication being managed by the call manager and call handler(s) according to the invention. A call handler according to the preferred embodiments of the present invention serves as a proxy for the remote target, performing operations on behalf of the target such that it appears to a sender system that a dedicated communication session exists with the target.

For some network services, optimising communications will require communications management according to the invention (call interception and redirection, spoofing, and protocol replacement) at both ends of the communication link.

The present invention thus provides a system and a method for intelligent handling of communication calls initiated by conventional network applications within a mobile environment.

The invention in a second aspect provides a computer program product comprising computer readable program code recorded on a computer readable storage medium, the computer readable program code including:

one or more call handlers; and a call manager for receiving communication calls generated by applications on a computer system on which the call manager is installed, the call manager including means for analyzing these communication calls to identify their origin and means for redirecting identified communication calls to a call handler component for further processing;

wherein the call handler component is adapted to transmit the communication call to its target destination using a preferred protocol.

The computer program product in a preferred embodiment comprises a software implemented mobile application framework, which can be installed on a mobile communication system for supporting management of data communications. The call manager component and the call handler component(s) in combination provide one of a plurality of services of the mobile application framework. This service can achieve efficient communications across wireless links for conventional network communication applications, without requiring any modification of the applications themselves. The services of the mobile application framework are preferably transparent to applications, but not necessarily to the end user who may be given constant information regarding the state of connectivity and the current cost of any communication calls.

BRIEF DESCRIPTION OF THE DRAWINGS

Preferred embodiments of the present invention will be described below, by way of example, with reference to the accompanying drawings in which.

DESCRIPTION OF PREFERRED EMBODIMENTS

Figure 1:
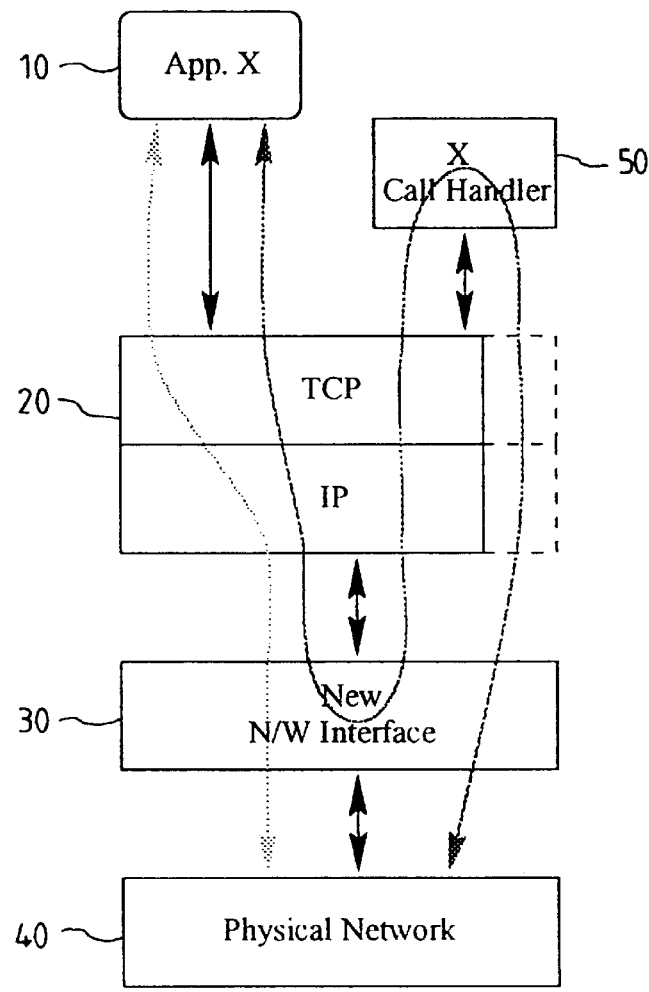
FIG. 1 is a schematic representation of a data communications system in which the invention is implemented according to a first embodiment of the invention.

A data communications system in which the present invention is implemented according to a preferred embodiment is represented schematically in FIG. 1. The invention may be implemented in many different computer system and operating system environments, but is particularly suited to improving communication efficiency of conventional network-communication applications running on mobile systems. FIG. 1 provides a simplified view of an hierarchical architecture for a data communication system, showing an application 10 making use of the services of the TCP/IP network protocol stack 20 which communicates with the physical network 40 via a network interface 30.

The layered architecture structure of communication networks is described by R. J. Cypser in "Communications for Cooperating Systems—OSI, SNA, and TCP/IP", Addison-Wesley, 1991 (in particular, see pages 47, 48). TCP/IP uses an 'unreliable', packet-oriented communications subsystem known as 'IP' to provide a datagram service called 'UDP', and a 'reliable', fully error-corrected, connection-oriented service known as 'TCP' (which builds on top of 'UDP'). 'IP' implements 'ICMP', which is a service used internally by IP for packet routing and certain other functions. Both UPD and TCP transmit data between two 'ports' on two hosts. Several logical connections may exist simultaneously between two hosts, each connection having a different port number. Network services such as ftp are implemented by a piece of communications code which is installed on a server for use when a connection is established on a particular port number. Services such as ftp, telnet, and WWW browsing, are thus assigned unique port numbers.

INTERCEPTION AND REDIRECTION OF CALLS

In the present embodiment of the invention, a new network interface 30 is installed below the TCP/IP communications stack 20 but above the physical network 40 (preferably as a layer above the standard network interface layer of the system), to intercept outgoing communication calls. All communication calls initiated by applications on the local system are sent via the new network interface (the outgoing calls are placed in memory within the interface prior to being written to the network, as with standard network interfaces).

Standard communication services—such as e-mail, telnet, or ftp—utilize pre-defined ports to communicate with a remote daemon, and the source and destination port numbers are included within outgoing data packets. For example, ftp clients connect to servers on port 21. By identifying the port number through which outgoing communication is initiated, the intended target daemon is inferred. According to the present invention, the port numbers are extracted from the intercepted calls and a sequence of simple table lookup operations is used to determine whether a packet should be redirected and, if so, where it should be directed to. Calls identified in a 'Redirection' lookup table are redirected to a call handler module 50, as shown in FIG. 1 and as described below with reference to FIG. 2. The tasks of interception, analysis and redirection are performed by the new network interface 30.

On system set up, the Redirection lookup table is initially empty. It is filled by the call handlers through a set of simple, well-defined input/output control ('ioctl') calls, which is known in the prior art as a standard way for exchanging data with an operating system kernel or a device driver. On call handler start-up, the call handler registers itself with the call manager, instructing the call manager to redirect to the handler all calls on a specific numbered port. The call manager updates the Redirection table appropriately.

An additional table is maintained with entries for applications which are required to communicate directly with the external network without redirection. The call handler modules (discussed in detail below) are applications requiring such 'pass-through' communication without redirection. The entries in this 'pass-through' table correspond to the source and destination of data packets, and so to communicate freely with the external network without calls being analyzed and possibly redirected, the call handler modules must connect from certain well defined ports. Also, a receiver of a communication may need to make a call to the sender of the communication and to avoid redirection of the call.

Finally, a separate table is held with 'watch' entries, comprising ip addresses. When a packet is received having any of these addresses, the address is automatically replaced with another address from the table, or the packet is redirected to a specialised call handler module if the address is not available.

Figure 5:
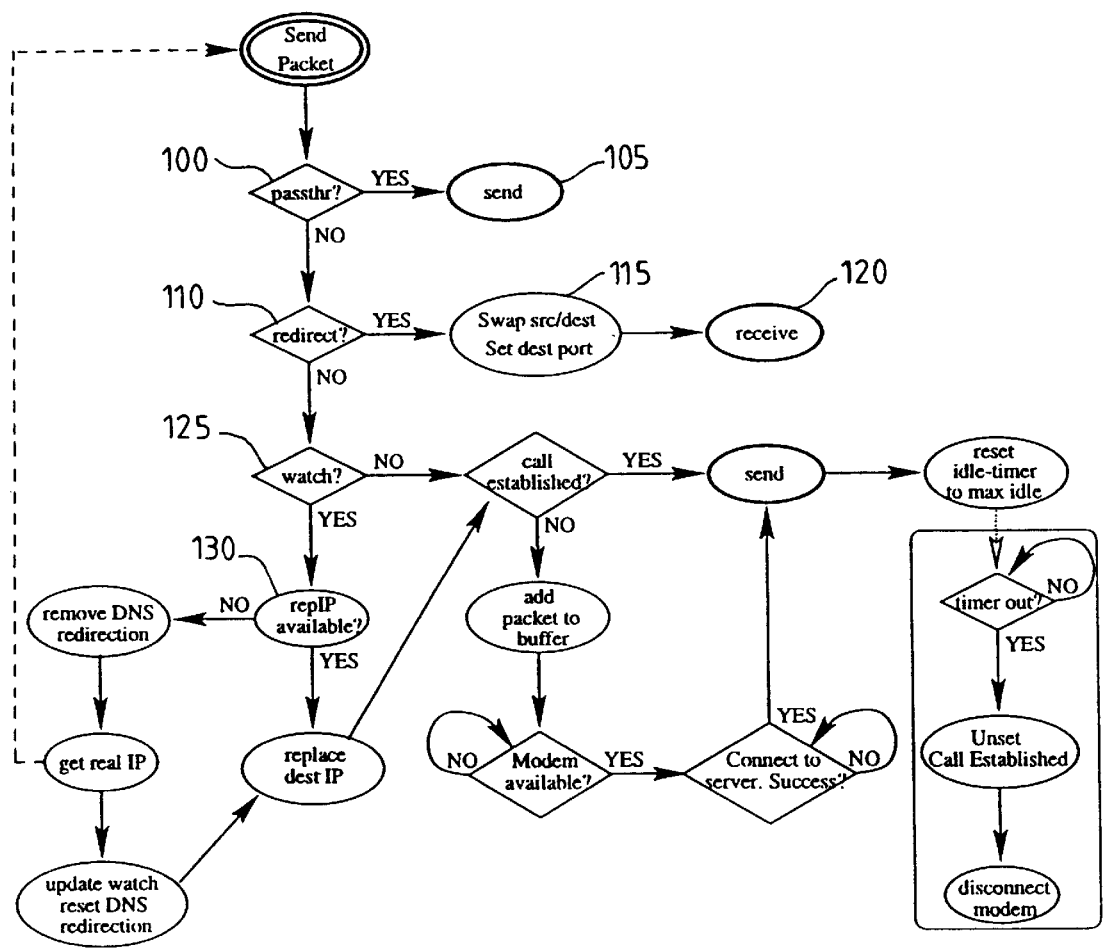
FIG. 5 shows data flows involved in sending a packet across a network.

The sequence of lookup operations using these tables is shown in FIG. 5, within the context of the sequence of data flows involved in sending a single packet to the network. The pass through table is scanned first (step 100) and if a matching entry is found then the packet is passed to the network (step 105). If no match was found in the pass through table, the Redirection table is scanned (step 110) and if there is a match then the source and destination addresses are swapped (step 115) and the packet is directed (step 120) to a new destination port See below). If no match was found, the watch table is scanned (step 125) and if there is a match and a replacement ip address is available then the destination ip address is replaced (step 135).

Calls which have their source and destination identified by the Redirection lookup table are then passed back upwards through the TCP/IP stack to a specific intelligent call handler module 50 appropriate to the requested service, this call handler having been identified in the lookup table.

Figure 2:
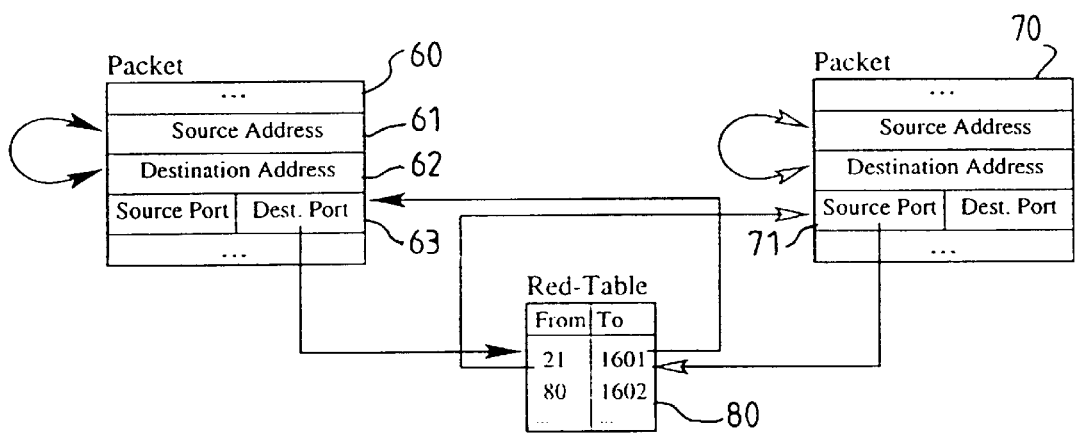
FIG. 2 shows redirection of calls from an application to a call handler module by reference to a redirection table, and redirection of the replies from the call handler module, according to an embodiment of the invention.

The redirection of a packet 60 to the selected call handler module is implemented as follows (see FIG. 2): the source and destination addresses 61,62 in the packet header are swapped with each other; and the destination port identifier 63 is replaced with the redirection port identifier taken from the Redirection table 80; the header checksum is re-computed; and the packet is then re-submitted into the TCP/IP communications stack for delivery to the call handler. This redirection of packets is shown in FIG. 2. A reverse operation, which involves replacing the source port identifier 71, is performed for reply packets 70 from the call handlers which are delivered to the original sender application.

If the call target cannot be identified by the table lookup process or there is no call handler available for the particular network service, the call is passed directly to the network, after establishing a data connection if required. The function of establishing a connection when required is provided by the network interface according to the invention.

CALL HANDLING

Standard services typically use well-defined communication protocols, which have been defined with regard to efficient communication across wired networks. They typically rely heavily on peer-to-peer acknowledgements. Such protocols are not optimised for a mobile environment, where bit error rates, line delays and costs are very different from those of wire data link environments. Call handlers according to the preferred embodiment of the present invention improve efficiency for mobile environments by:

generating acknowledgements locally—acting as a proxy for the remote target—and in some cases batching real transmissions to the remote end, and so avoiding unnecessary connections; and handling the specific native service protocol locally and using a transmission protocol which is optimised for the data link characteristics, the applications, and the data.

In particular, the TCP/IP connection initiated by the application program is terminated within an application-specific call handler module after redirection on the local host. The call handler module impersonates the remote side of the communication and relays all required information through a gateway using a task-specific, highly optimised communications protocol. At its simplest, the protocol replacement involves stripping protocol-specific information from the communication to return to the message data and then generating a new call which encapsulates the data in accordance with the new protocol. Other implementations do not simply re-encapsulate the data, but employ intelligent agent functions to reduce data transfers.

Although local generation of acknowledgements appears to involve an assumption of communication success which may not be justified, this is not a problem. Firstly, the replacement optimised protocol can include whatever level of delivery assurance is required and so the delivery confirmation of the initial protocol can be dispensed with. Secondly, confirmation of delivery of a service request would not guarantee successful performance anyway.

Call handler modules thus provide platforms for increasing the efficiency of individual network services such as ftp by protocol replacement, the preferred protocols being made available to all applications using these services.

A number of call handler modules, and their interaction with a call manager and with one of a plurality of standard network applications to improve communication performance for specific network services, will now be described in detail. When each of the specific call handlers is installed on the local system, it provides to the call management component information regarding the calls to be redirected to that handler.

1. Telnet

Telnet is a communications protocol for remote login sessions. In principle, a client process using the telnet protocol catches all keystrokes and sends these to a server. All keystrokes are then executed on the server and the output is sent back to the client. While commands are entered the server generates no output; it merely mirrors the stream of keystrokes received from the client back to the client. For wired connections, this is useful in that it provides constant feedback on the quality and state of the link. However, in a wireless network such feedback data communication is an undesirable overhead and the link is less likely to be constant.

Figure 3:
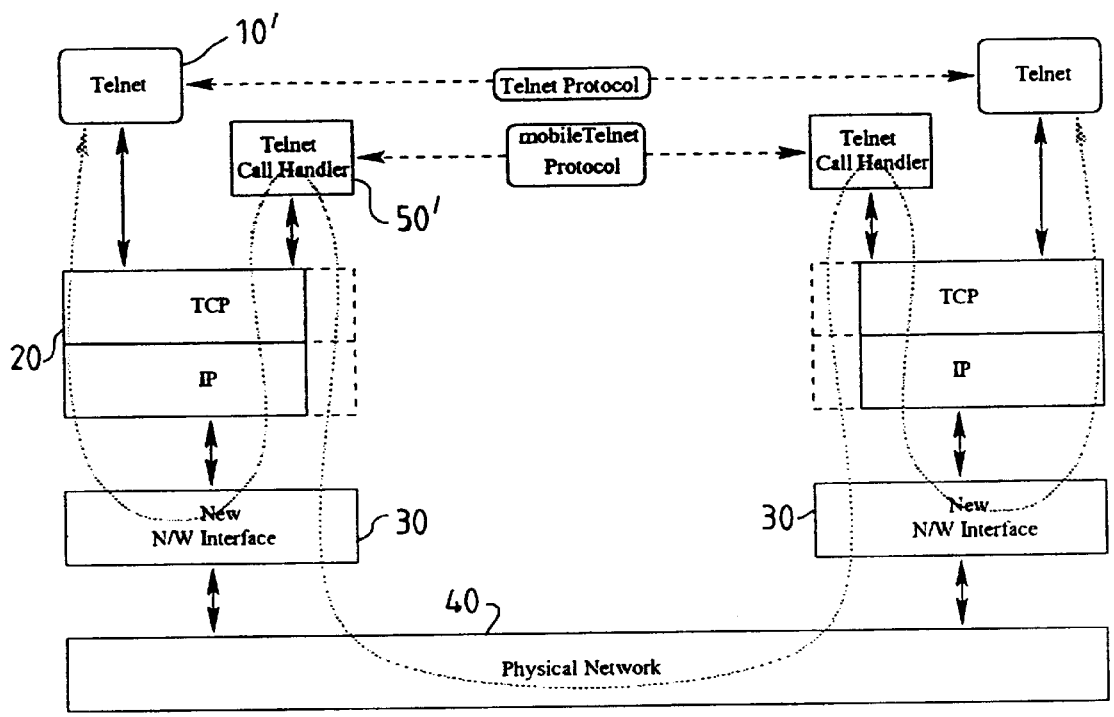
FIG. 3 shows call management according to the invention implemented at both ends of a communication link for the example of a call initiated using the telnet protocol.

Thus, it is preferable to locally generate the acknowledgements that are part of the telnet protocol and bulk transmit commands to the server, and then bulk transmit their output back to the server. For the telnet protocol, a suitable call handler module is therefore provided at both the client and server end of the communication as shown in FIG. 3. The local call management module at each end of the call intercepts all calls directed via an identified port (for example, port 15) and redirects them to the call handler which is registered with the call management module for Telnet calls. The local call handler at each end impersonates the remote end of the communication, and a more suitable protocol is employed between the call managers over the wireless link.

2. E-mail

A second, and very important, example of a network application is e-mail. e-mail messages are known to be generated by a user using a 'mail user agent' which then passes the message on to the local 'mail transfer agent'. The 'mail transfer agents' pass messages on between each other towards a target destination. At the target destination, the message is passed to the local 'mail delivery agent' which finally delivers the message to the user's mail box.

Once the message has been created by the user and has been received by the local 'mail transfer agent', this agent will immediately attempt to contact the next 'mail transfer agent' on route to the target destination. To improve efficiency for a wireless environment, the mail transfer agent is controlled by the present invention to initiate communication only if the message has sufficiently high priority. This is achieved with no modification being required to the original mail transfer agent.

On the client side, the communication initiated by the mail transfer agent is intercepted and re-directed to an intelligent call handler for the mail protocol. This call handler will impersonate the remote mail transfer agent and will acknowledge the intercepted mail message in the usual manner. Actual transmission of the mail is then deferred according to rules defined for the intelligent call handler. In the preferred embodiment, these rules determine when e-mail is to be transmitted in dependence upon:

the priority of the mail message;

the cost of the network connection; and the number of mail items awaiting transmission.

3. File Transfer Protocol

A third example of use of the invention according to a preferred embodiment will now be described for the file transfer protocol (ftp). ftp is a protocol designed for safe and efficient transfer of files, which is adapted for permanent connections. Although used as a stand-alone function, the functionality of ftp is used extensively within applications to download files, often invisibly to the end user. The ftp login procedures are static and replies can be 'spoofed' effectively using the present invention (that is, they can be generated locally while appearing to the application that they are generated remotely). File transfers through ftp are inefficient over TCP/IP links when compared with a thin-wire protocol such as 'Z-modem'. A call handler according to the invention is therefore set up to replace the TCP/IP protocol with such a thin wire protocol for the actual data transfer.

Optimised use of ftp in accordance with the invention involves local caching of file structures of databases which are regularly accessed, permitting the application to read the file structure at will without having to establish a connection. Some regularly accessed files are also cached, in accordance with heuristics determining which files to cache for maximum user benefit without unacceptable use of memory space. Cache refresh is performed when connections are established. The intelligent connection manager is then able to determine the need to establish a connection dependent on user requirements, driving the file structure and critical file update processes as background tasks during the session established to deliver the user-demanded data.

A call handler for ftp according to the preferred embodiment spoofs the entire ftp login procedure and establishes connectivity only when files or directories not already held in local cache are being requested. In particular, connectivity is established to a gateway application only if one of the following commands is issued:

'dir'- to display the directory contents, after the user has acknowledged that connectivity is desired;

'get'- to retrieve a file from the remote host; and

'put'- to transfer a local file to the remote host.

Figure 4:
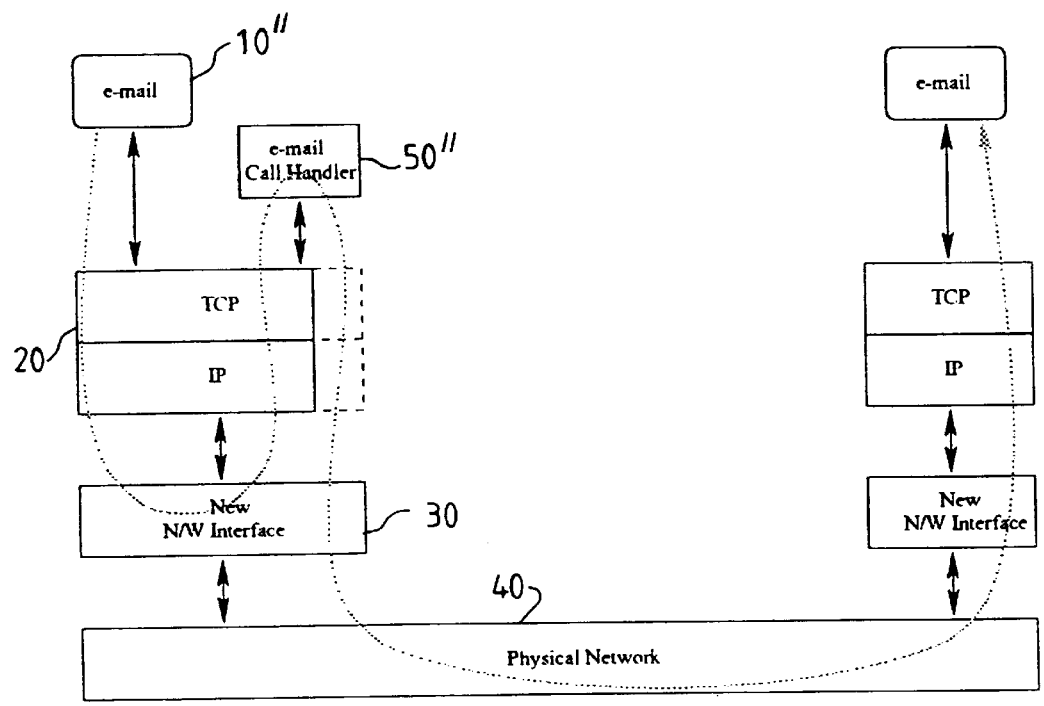
FIG. 4 shows an asymmetric arrangement in which a call handler for e-mail or ftp is implemented at the sender end of the communication only.

The gateway establishes an ftp session to the actual target host and forwards all relevant data to and from the call handler module. The protocol between the call handler module and the gateway is optimised. FIG. 4 illustrates a suitable system architecture for e-mail and ftp communication optimisation, which is asymmetric: outgoing calls are cached and optimised on the initiating side only.

Figure 6:
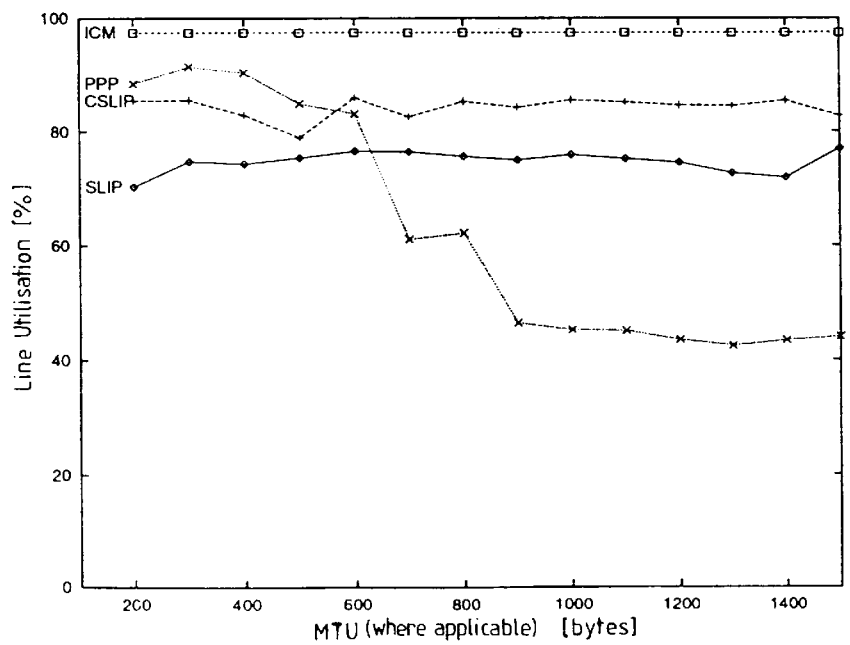
FIG. 6 shows experimental measurements of line utilisation during bulk data transfer.

Experiments were carried out using a call handler for the ftp class of protocols. An asymmetric set-up with a gateway and a GSM cellular data connection at 9.6 kbits per second provided connectivity between a mobile host and the gateway. The file transfer times for a 10 kbyte file achieved by the Call Handler according to the invention using the Z-modem protocol referred to above were compared with connections between the same ftp client and the server over a TCP/IP connection through SLIP, compressed SLIP and PPP (see below). FIG. 6 shows the line utilisation of the four protocols plotted against the maximum transfer unit size, where the line utilisation is defined to be the ratio of the amount of actually transmitted data to the theoretical capacity of the line (allowing for modem framing where applicable):

$$\text{utilisation} = \frac{\text{amount of data}_{byte} \times (\text{databits}_{bit} + \text{stopbits}_{bit})}{\text{speed}_{bits\ per\ sec} \times \text{transfer time}_{sec}}$$

"SLIP" is a protocol described by J. Romkey in "A non-standard protocol for transmission of ip datagrams over serial lines: Slip", RFC 1055, Network Working Group, June 1988. "Compressed SLIP" was described by V. Jacobson in "Compressing TCP/IP headers for low-speed serial links", RFC 1144, February 1990. "PPP" is described by W. Simpson in "The point-to-point protocol (PPP)for the transmission of multi-protocol datagrams over point-to-point links", RFC 1331, Network Working Group, May 1992.

The MTU range 250–1500 represents the allowable range of 'Maximum Transfer Unit' of the particular computer on which the tests were run. As can be seen from FIG. 6, the ftp connection using the call management facilities of the present invention outperforms PPP by at least 6.5% and much more for higher MTU values, CSLIP by at least 14.5% and SLIP by at least 21.95%. The performance of SLIP, CSLIP and PPP are dependent on the maximum transfer unit (MTU) whereas the optimised protocol provided by the call handler module is not. The file transfer time was also significantly reduced using the call handler implemented protocol optimisation of the invention.

The cost of these advantages is that the transmission line is dedicated to ftp, such that other users or applications are not allowed access. However, this may not be prohibitive. During transmission, the ftp call handler module continuously produces progress reports detailing the percentage of the data file transferred, the cost so far, and the estimated total cost of the file transfer. These are presented to the user in a progress information window. The user is also enabled to abort the transfer at any time. These report and abort usability features are very difficult for a TCP/IP client to provide.

Once connection has been established, the connection remains open for a maximum allotted time period (30 seconds), or until the next command requiring connectivity is issued.

4. Domain Name Service

The domain name service (DNS) is used to resolve host names into the actual ip address. Although the DNS usually keeps an extensive cache network, connectivity is sometimes required to resolve unknown host names. Small notebook computers generally do not have a DNS at all, thus requiring connectivity for all address resolutions on behalf of the local host.

The call handler module for the DNS intercepts outgoing calls and sends in a reply a temporary ip address. The call handler ensures that whenever this temporary ip address appears in later communications it is either not used (if the call is terminated by another call handler module), or an actual DNS-request is started across the network to determine the actual ip address. The method is as follows:

Once a temporary ip address has been issued, the temporary ip address is entered into a database containing the temporary ip address and the host name it was issued for. Additionally, it is also entered into the 'watch' list. If a packet is intercepted to that ip address, it is first redirected to the DNS call handler module. Network connectivity is then established and the actual ip address is requested. The temporary ip address in the watch list is then supplemented with the actual ip address. Hence, further packets to the temporary ip address can be automatically re-addressed when checked against the watch list.

If data is redirected to other call handler modules, these check the destination ip address with the database of temporary ip addresses and ensure that the temporary ip address is not used when connecting to the remote side.

5. WWW browsing

A call handler module is also provided for the World Wide Web's HTTP protocol. Calls to HTTP servers are intercepted and page-contents transferred using the same replacement protocol as for ftp (see above). Hence, similar performance increases are achieved when down-loading Web pages as for ftp files. Similar to ftp, the WWW call handler module also produces regular status messages regarding the state of the current Web page transfer.

An extension to this support for browsing the World Wide Web which is provided in one embodiment of the present invention is a mechanism to pre-fetch pages while a modem connection is held open in between page requests from the user (the unused connection is held open for a maximum of 30 seconds). There are many Web page dependencies with high probabilities (i.e. high probabilities that a user will want to see a page B within, say, 60 seconds of requesting a page A). The mechanism according to this aspect of the invention exploits these dependencies by initiating a page transmission before the user has requested it, reducing latency.

In the embodiment of the invention described above, the new network layer for intercepting outgoing calls is implemented between the IP layer and the standard network layer. This positioning of the new layer does not adversely affect TCP/IP performance according to experimental tests. An alternative implementation provides the same call interception and redirection functionality, but implements this on the device driver layer. This has the advantage that no modifications are required to the operating system kernel, allowing code implementing the call management functions of the invention to be installed on a great many different running computers without requiring access to system source code. Although more decoding is required with this embodiment, to identify a TCP/IP packet as such, only a 2% performance impact has been noted in experiments.

The above description refers to use of port numbers for identifying different network services using TCP/IP. For protocols other than tcp/ip, such as SNA, alternative methods of identifying the requested service are available and would be used instead of port number identification to implement the present invention.

What is claimed is:

1. A data communications system including:

one or more call handlers; and a call manager for receiving communication calls having a data content, a target destination and an initial communication protocol which calls are generated by application programs on the system, the call manager including means for analyzing these communication calls to identify their origin and service type and means for redirecting identified communication calls to a call handler for further processing;

wherein the call handler is adapted to locally terminate the redirected initial communication and then to initiate a new communication call including the data content of the initial communication call, the call handler then transmitting the new communication call to the target destination using a protocol which is preferred for the identified service type and which replaces the initial protocol of the initial communication call.

2. A data communications system according to claim 1, wherein the call manager is adapted to identify service types of communication calls from source port numbers of the calls, and to redirect a communication call to a call handler selected in accordance with the identified service type of the communication call.

3. A data communications system according to claim 1, wherein the call handler is adapted, for an initial call protocol requiring an acknowledgement by the target of receipt of the call, to locally generate the acknowledgement of receipt and to send this acknowledgement to the sender application program.

4. A data communicatioins system according to claim 2, including a call handler for Telnet.

5. A data communications system according to claim 2, including a call handler for E-mail.

6. A data communications system according to claim 2, including a call handler for ftp.

7. A data communications system according to claim 2, including a call handler for DNS.

8. A data communications system according to claim 2, including a call handler for WWW browsing.

9. A method of managing network communications from a data communications system, wherein the communications system includes one or more call handlers and a call manager, the method including the following steps:

intercepting by said call manager communication calls having a data content, a target destination and an initial communication protocol, which calls are generated by application programs on the system, analyzing these communication calls to identify their origin and service type and then, according to said identification, redirecting identified communication calls to a call handler for further processing;

in response to receipt of a redirected call by said call handler, locally terminating the redirected initial communication and initiating a new communication call including the data content of the initial communication call, the call handler then transmitting the new communication call to the target destination using a protocol which is preferred for the identified service type and which replaces the initial protocol of the redirected communication call.

10. A computer program product comprising computer readable program code recorded on a computer readable storage medium, the computer readable program code including:

one or more call handlers; and a call manager for receiving communication calls having a data content, a target destination and an initial communication protocol, which calls are generated by applications on a computer system on which the call manager is installed, the call manager including means for analyzing these communication calls to identify their origin and service type and means for redirecting identified communication calls to a call handler component for further processing;

wherein the call handler component is adapted to locally terminate the redirected initial communication and then to initiate a new communication call including the data content of the initial communication call, the call handler then transmitting the new communication call to its target destination using a protocol which is preferred for the identified service type and which replaces the initial protocol of the initial communication call.

* * * * *